United States Patent [19]
Shimada

[11] Patent Number: 5,832,285
[45] Date of Patent: Nov. 3, 1998

[54] BATTERY POWERED COMPUTER CAPABLE OF SWITCHING TO A SUSPEND MODE BASED ON THE CONNECTION STATUS OF AN EXTERNAL DEVICE

[75] Inventor: Naoki Shimada, Tokyo, Japan

[73] Assignee: Canon Kabushiki Kaisha, Tokyo, Japan

[21] Appl. No.: 607,166

[22] Filed: Feb. 26, 1996

[30] Foreign Application Priority Data

Feb. 28, 1995 [JP] Japan ................................. 7-065117

[51] Int. Cl.⁶ ........................... G06F 1/00; G06F 1/18; G06F 1/26
[52] U.S. Cl. ................. 395/750.05; 395/750.03; 395/750.06; 395/282; 395/283
[58] Field of Search ....................... 395/750, 282, 395/283, 550, 309, 835, 750.03, 750.06, 750.07, 750.08, 822, 837, 838, 839, 882, 883, 750.05; 364/707

[56] References Cited

U.S. PATENT DOCUMENTS

| | | | |
|---|---|---|---|
| 5,230,074 | 7/1993 | Canova, Jr. et al. | 395/750 |
| 5,394,552 | 2/1995 | Shirota | 395/750 |
| 5,410,713 | 4/1995 | White et al. | 395/750 |
| 5,471,624 | 11/1995 | Enoki et al. | 395/750 |
| 5,485,623 | 1/1996 | Kurokawa et al. | 395/182.2 |
| 5,513,359 | 4/1996 | Clark et al. | 395/750 |
| 5,526,493 | 6/1996 | Shu | 395/281 |
| 5,537,584 | 7/1996 | Miyai et al. | 395/183.18 |
| 5,546,589 | 8/1996 | Odaira | 395/750 |
| 5,546,590 | 8/1996 | Pierce | 395/750 |
| 5,553,294 | 9/1996 | Nanno et al. | 395/750 |
| 5,560,022 | 9/1996 | Dunstan et al. | 395/750 |
| 5,606,704 | 2/1997 | Pierce et al. | 395/750 |
| 5,671,368 | 9/1997 | Chan et al. | 395/282 |
| 5,752,048 | 5/1998 | Antol et al. | 395/750.05 |
| 5,752,050 | 5/1998 | Hernandez et al. | 395/750.07 |

*Primary Examiner*—Ayaz R. Sheikh
*Assistant Examiner*—Raymond N. Phan
*Attorney, Agent, or Firm*—Fitzpatrick, Cella, Harper & Scinto

[57] ABSTRACT

Disclosed is a battery powered computer, for which operating power is provided by a battery. A battery powered computer according to the present invention comprises a detector for detecting a connection state for the battery powered computer and an external device, and a determiner for, when a request is made to shift to a suspend mode in which consumption of power supplied by the battery is lower than in a normal state, at least determining, in consonance with the connection state detected by the detector, whether or not an operation mode is to be shifted to a suspend mode.

16 Claims, 17 Drawing Sheets

BATTERY POWERED COMPUTER CAPABLE OF SWITCHING TO A SUSPEND MODE BASED ON THE CONNECTION STATUS OF AN EXTERNAL DEVICE

BACKGROUND OF THE INVENTION

1. Field of the Invention

The present invention relates to a computer that can be operated using the power that is supplied by a battery.

2. Related Background Art

Many portable computers have been and are being produced that can be operated using the power that is supplied by batteries. Therefore, since the capacity of a battery that is employed for such a battery powered computer is limited, and since the battery operating time is also limited, how to effectively employ the power provided by a battery is a very important, much discussed subject.

To provide more efficient use of the power supplied by a battery, one employment practice, for example, involves the frequent switching off of the power switch of a computer, when operation of the computer is temporarily halted, so as to reduce the consumption of battery power. In this case, however, before the power is switched off, all processing must be terminated. More specifically, all data that have been processed must be stored in nonvolatile memory, and any program that is in the process of being executed must be halted. Then, when processing is to be resumed, operations such as powering on, program execution, and the retrieval of data are required. Since the execution of this "power saving" function, which involves the turning on and off of a power switch, is accompanied by complicated operations that place a heavy load on an operator, in the long run, "power saving" using a power switch often is not carried out.

In an effort to ensure that battery power is effectively used, a method has been provided whereby the operational mode of a computer is automatically shifted to a power suspend mode when the supply of power from a battery is reduced. The power suspend mode, which is intended to extend the service life of a battery, is an operational mode during which the power that is supplied to the individual sections of a computer is less than that which is supplied during a normal operational mode. Although insufficient power is supplied during the suspend mode for the normal operation of a computer, the power that is supplied is sufficient to hold a program, and data, that an operator is working on in memory while the execution of the program is suspended. Another method (called a 0 V suspend mode) provides for the halting of the supply of power to sections other than a section that is required for the detection of a command to recover from a suspend mode. As is described above, several methods by which to reduce power consumption have been proposed for battery powered computers.

The following description discusses the relationship between the execution of the suspend mode function and the operation of an external device that is connected to a computer. Commonly, a computer and an external device will be mutually connected at a port through which electronic signals, data and commands, can be exchanged. In such a case, it is highly probable that at one time or the other the computer may, for some reason (an instruction from an operator, the expiration of the service life of a battery, etc.), enter the suspend mode while data and/or commands are being exchanged with the external device. When this happens, when the operational mode is shifted to the suspend mode, the computer will suddenly halt the transmission and the reception of data and/or commands, and the connected external device will not be able to continue its normal operation. Following this, when the recovery of the computer from the suspend mode occurs, the computer will tend to continue the suspended processing, using the program and the data that have been retained, but the connected external device will not always be able to normally process the commands and/or data that are transmitted.

In such a situation, since it will appear to an operator that the operating state of a computer that has recovered from the suspend mode is the same as the operating state before the computer entered the suspend mode, the operator may thereupon attempt to perform an operation using the external device that is connected to the computer. But since the external device is not ready to resume normal operation, it will not perform the process the operator desires. And as only at this time will the operator become aware that the connected external device is not set for normal condition, the operator will be unnecessarily inconvenienced.

To carry this idea further, suppose that the connected external device is a communication device that sequentially receives data from the outside and transfers the data to the computer. When the computer is shifted to the suspend mode, the external device will not be able to transfer to the computer data that it received and the data may be lost.

SUMMARY OF THE INVENTION

To overcome the shortcomings, it is one object of the present invention to appropriately perform a process for shifting to a suspend mode, or a process for recovering from the suspend mode, in consonance with the status of the connection of a computer to an external device.

To achieve the above object, according to the present invention, a battery powered computer, for which operating power is provided by a battery, comprises: detection means for detecting a connection state for the battery powered computer and an external device; and determination means for, when a request is made to shift to a suspend mode in which consumption of power supplied by the battery is lower than in a normal state, at least determining, in consonance with the connection state detected by the detection means, whether or not an operation mode is to be shifted to a suspend mode.

In addition, to achieve the above object, according to the present invention, a battery powered computer, for which operating power is supplied a battery, comprises: detection means for detecting a state in which the battery powered computer is connected to an external device; and control means that, when a request is made to recover from a suspend mode, wherein consumption of power supplied by the battery is lower than for a normal state in a normal operational mode, and the detection means detects that the battery powered computer is connected to an external device, gives a warning indicating the external device is connected and is recovering from the suspend mode to the normal operational mode, or that, when the detection means does not detect that the battery powered computer is connected to an external device, recovers immediately from the suspend mode to the normal operational mode.

DETAILED DESCRIPTION OF THE PREFERRED EMBODIMENTS

Figure 1:
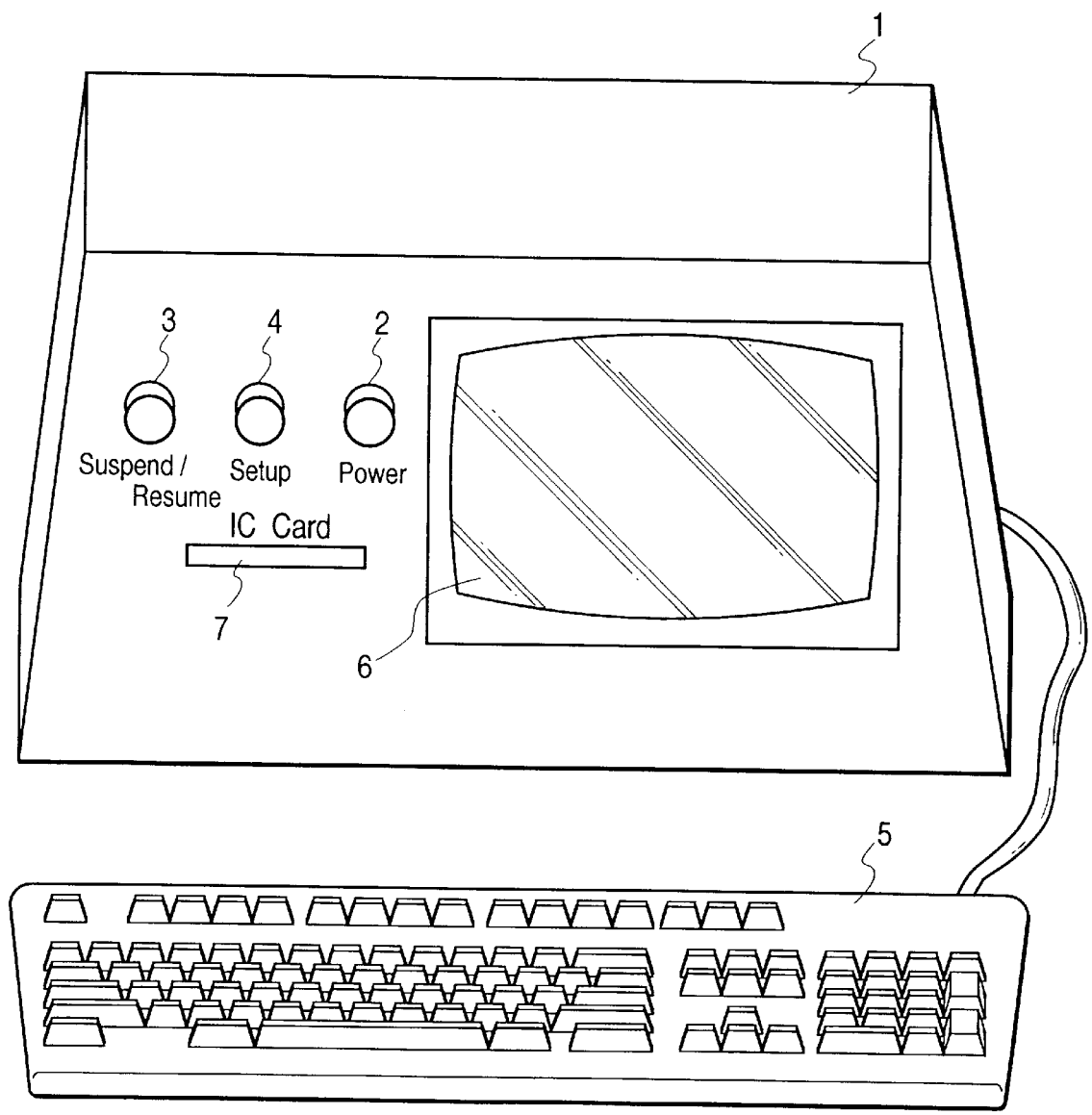
FIG. 1 is a diagram illustrating the outline of a battery powered computer according to embodiments of the present invention.

The preferred embodiments of the present invention will now be described while referring to the drawings.

FIG. 1 is a diagram illustrating the outline of a battery powered computer according to the embodiments of the present invention. In FIG. 1, a power switch 2, on a computer main body 1, is a push button switch that is depressed once to power on and is depressed once more to power off. A suspend mode switch (also called a suspend/resume button) 3, like the power switch 2, is a push button switch. When the suspend mode switch 3 is depressed in the normal operation state, the computer 1 is shifted to a suspend mode. Thereafter, when the suspend mode switch 3 is again depressed, the computer 1 is recovered to the normal operation state. The suspend mode will be explained in detail later.

A setup push button switch (also called a setup button) 4 is employed to alter the operational state of the computer 1 without terminating a process that is being executed. When the setup switch 4 is depressed, the clock of the computer 1 is altered, or a determination is made as to whether or not the operational mode should be shifted to a suspend mode when the power that is being supplied by a battery is reduced. A keyboard 5 is used for the input of a various data items and instructions. A CRT (Cathode Ray Tube) 6 serves as a display device, and an insertion port 7 is provided into which an IC card is inserted for loading.

Figure 2:
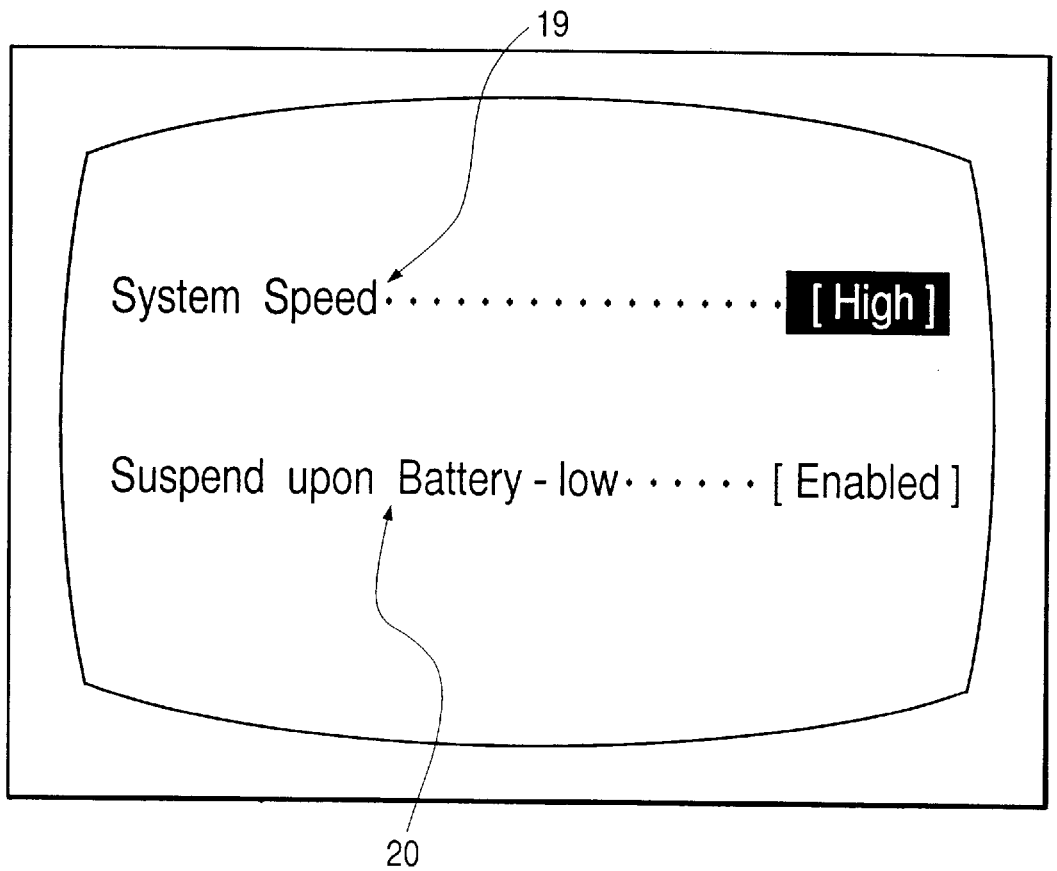
FIG. 2 is a diagram showing a setup screen.

In FIG. 2 is shown an example setup screen that is displayed on the CRT 6 when the setup switch 4 is depressed. In FIG. 2, System Speed 19 indicates a selected execution speed for a computer 1. Either "High" as shown in FIG. 2 or "Low" can be selected as the execution speed. As is commonly known, a reduction in the consumption of battery power can be effected by decreasing the execution speed of the computer.

Suspend upon Battery-low 20 indicates the condition that governs the determination of whether or not the operational mode is to be shifted to a suspend mode when power supplied by a battery is reduced. The execution speed "High" that is highlighted in FIG. 2, and which indicates the current execution speed for the computer 1, can be changed. Changes in the setup are effected by using the arrow keys on the keyboard 5, which will be described later. That is, in this instance "High" or "Low" can be selected by depressing the right or the left arrow key, and switching between the setup for System Speed 19 and the setup for Suspend upon Battery-low 20 can be performed by depressing either the up or the down arrow key. The "Enabled" that is displayed immediately following Suspend upon Battery-low 20 when that setup is selected is highlighted in order to indicate it can be changed to "Disabled", which will be described later.

To change the setup for Suspend upon Battery-low 20, either the left or the right arrow key is depressed to switch between "Enabled" and "Disabled". When "Enabled" is set, the operational mode is automatically shifted to a suspend mode when the amount of available battery power is low. When "Disabled" is set, the operational mode is not shifted to the suspend mode even when the amount of available battery power is low. An escape key on the keyboard 5 may be depressed to terminate the setup mode.

Figure 3:
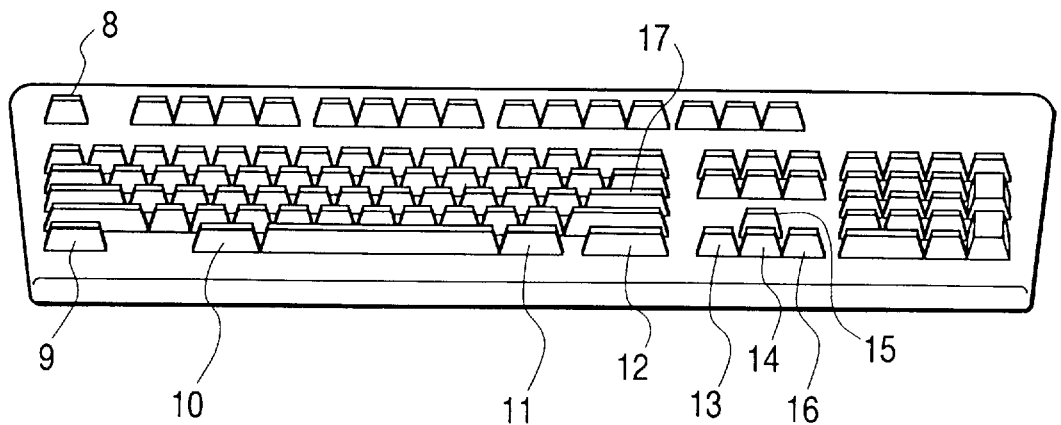
FIG. 3 is a diagram showing a keyboard.

As is shown in FIG. 3, provided on the keyboard 5 are several function keys: an ESC (escape) key 8, a left CTRL (control) key 9, a left ALT (alternate) key 10, a right ALT (alternate) key 11, a right CTRL (control) key 12, a left arrow key 13, a down arrow key 14, an up arrow key 15, a right arrow key 16, and an enter key 17. The left arrow key 13 and the right arrow key 16 together constitute what is called a left and right arrow key set, and the down arrow key 14 and the up arrow key 15 together constitute what is called an up and down arrow key set.

An IC card that for use can be loaded through the IC card insertion port 7 is a card that functions in the same manner as does a data memory medium, such as a common floppy disk. Since an SRAM (a random access memory for which writing access is not required each time) is normally used for such an IC card, a backup battery is provided on the IC card to hold data. The IC card will be described in detail later.

Figure 4A:
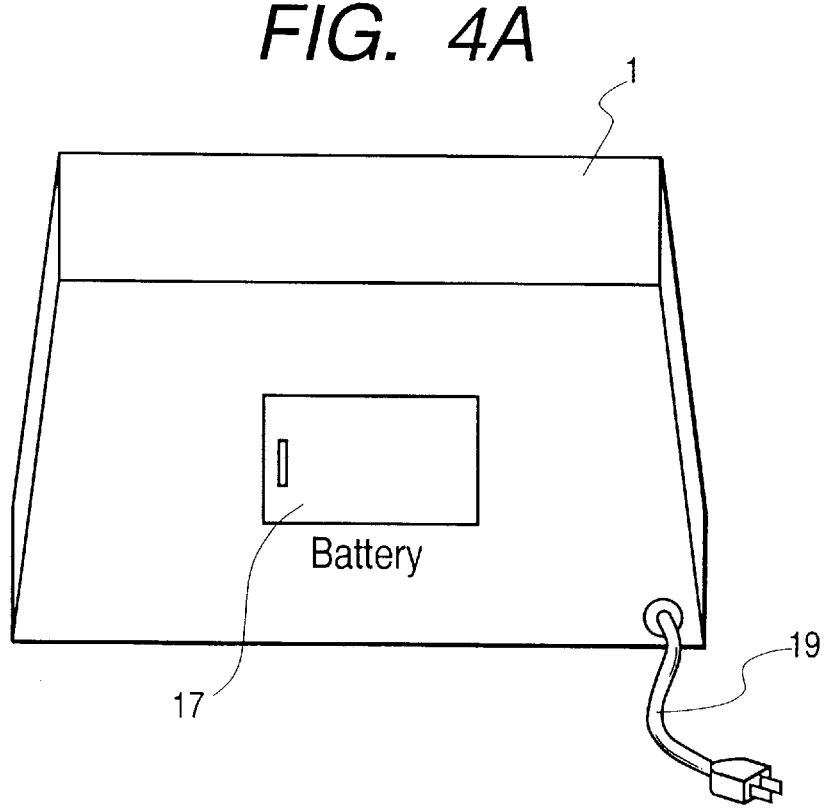
FIGS. 4A and 4B are rear views of the battery powered computer in FIG. 1.
Figure 4B:
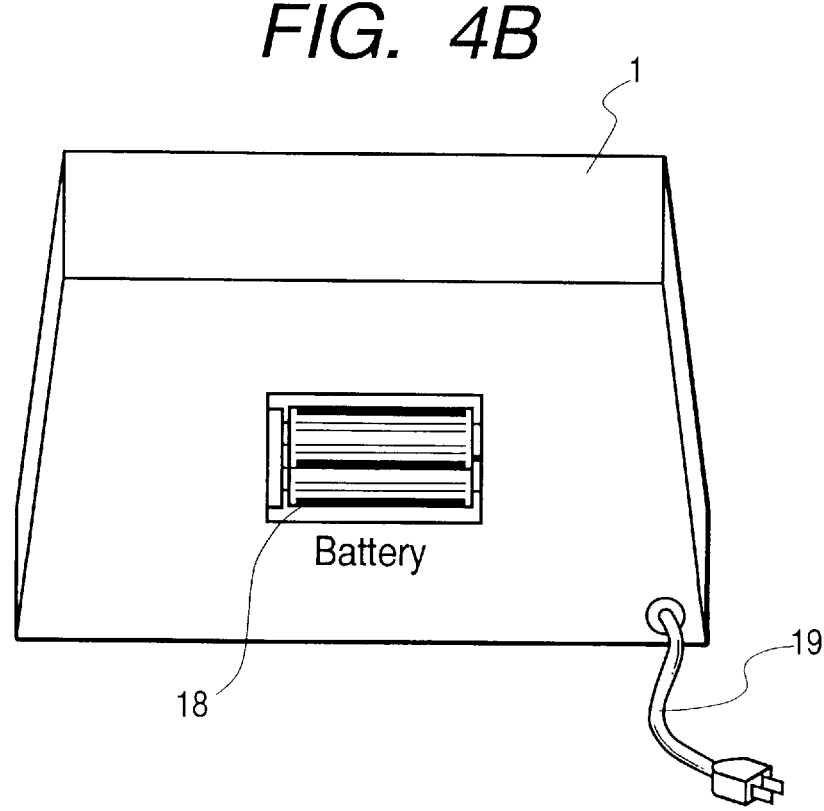

As is shown in FIG. 4A, a cover 17 is so attached at the rear face of the computer main body 1 that it is detachable, and rechargeable batteries 18 are stored behind the cover 17, as is shown in FIG. 4B. When the batteries 18 are fully charged, the computer 1 can be operated for about two to three hours without it being necessary for a power cable 19 to be connected to the outlet of a commercially available power source.

When the power cable 19 is connected to the power outlet, the batteries 18 are recharged regardless of whether or not the computer main body 1 is powered on. As the batteries 18 can be removed, when the charge held by the batteries 18 is consumed and they can supply no more power, these batteries 18 can be replaced with new, fully charged batteries 18. The operational time period that is available when using battery power varies depending primarily on how long the operated section has been used. For the computer system, the status of the employment of an HDD, which will be described later, varies the operation time period by using battery power.

Figure 5A:
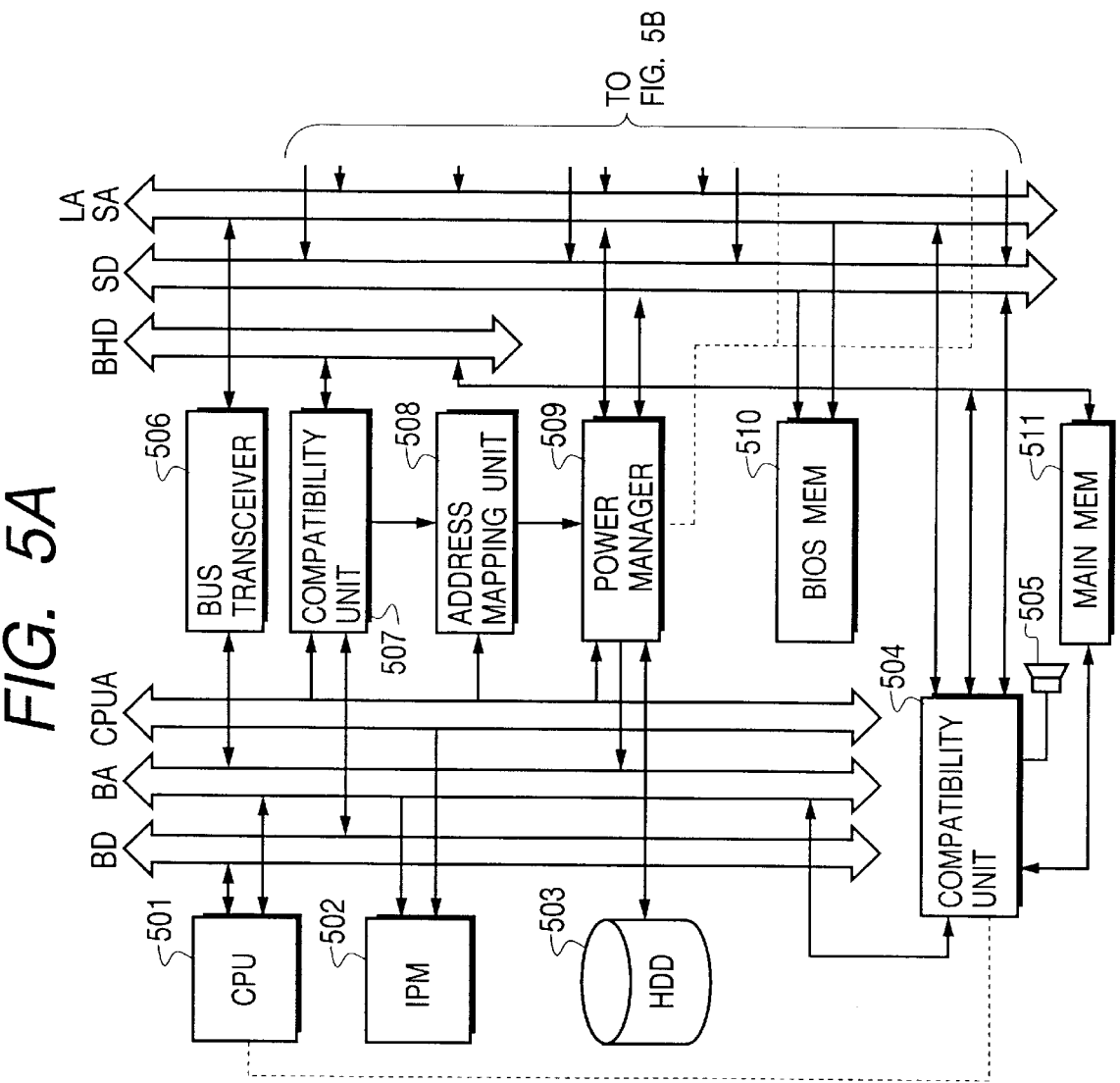
FIG. 5 is comprised of FIGS. 5A and 5B showing schematic block diagrams illustrating the electrical arrangement of the battery powered computer.
Figure 5:
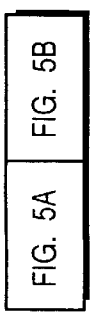
Figure 5B:
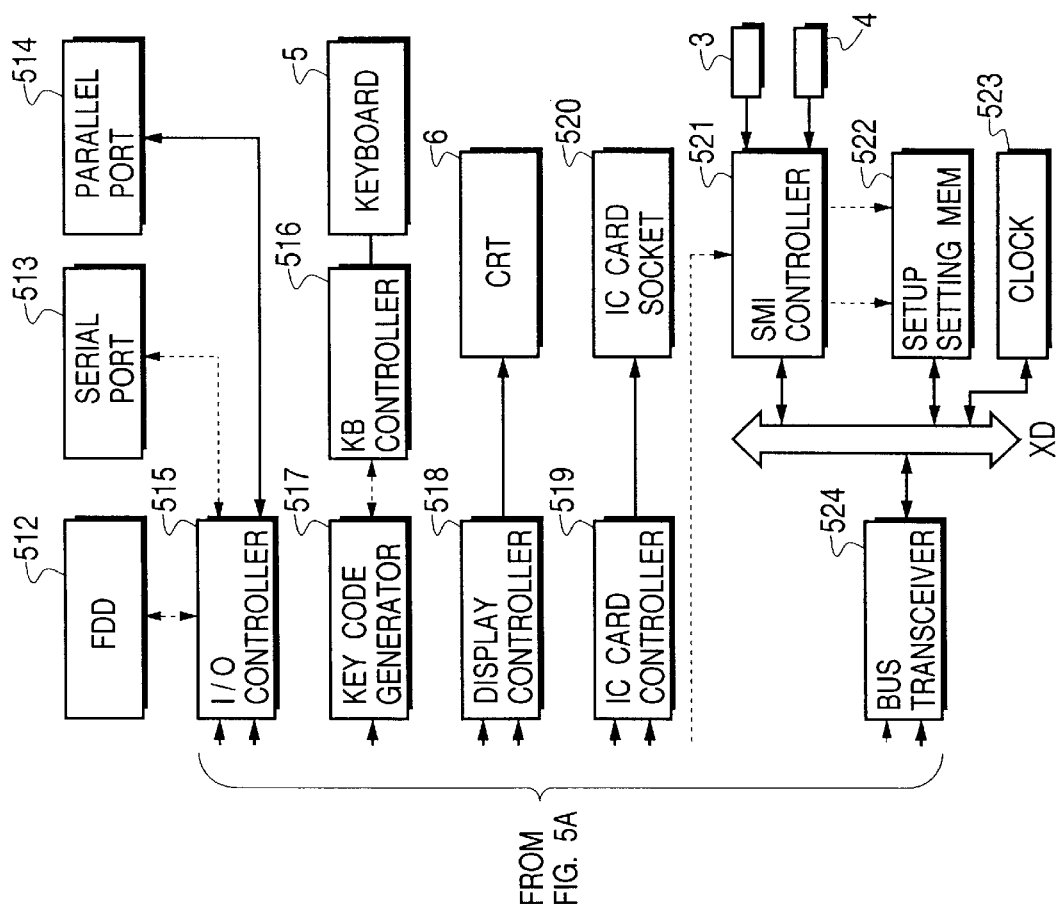

FIGS. 5A and 5B are schematic block diagrams illustrating the arrangement of the computer system. A CPU 501 controls the operation of the computer system. An IPM (Instruction Power Management unit) 502 monitors address bus BA of the CPU 501. When the change in address bus BA and address bus CPUA (another address bus of the CPU 501) is the repetition of the same pattern, the IPM 502 lowers the clock frequency of the CPU 501 to reduce the consumed power.

An HDD 503 is a hard disk drive, and compatibility units 504 and 507 are employed so that the computer system serves as a so-called IBM PC compatible specification. The compatibility unit 504 also drives a loudspeaker 505. An audible warning is output at the loudspeaker 505 to signal that the remaining capacity of the batteries 18 is low. Bus transceivers 506 and 524 serve as bidirectional buffers for the address buses.

An address mapping unit 508 generates address data that are to be sent to a power manager 509. When there is no change in the address data received from the address mapping unit 508, the power manager 509 executes a DOZE mode in which the clock frequency of the CPU 501 is reduced to one eighth of its normal frequency. When the computer has not been operated for a specified time, to reduce power consumption, the power manager 509 performs display control by erasing the display on the CRT 6, detects the remaining battery capacity, and examines the status of the power cable 19 to determine whether or not it has been connected to a power outlet.

A BIOS memory 510 is employed to store a program that concerns basic input/output for the operation of the computer. A 4-MB DRAM (a random access memory for which a writing operation is required each time) is mounted as a main memory 511 of the computer. BHD and SD represent local data buses, and LASA represents a local address bus.

An FDD 512 is a floppy disk drive. A serial transfer port 513, which conforms to the RS-232C standard, and a parallel transfer port 514, which conforms to the Centronics standard, are both controlled by an I/O controller 515. A keyboard controller 516 controls the keyboard 5 and also generates an identification signal for a key that is depressed by a user. Serial transmission is employed to send the key identification signal to a key code generator 517. The key code generator 517 generates a key code in consonance with the received key identification signal, and transits the key code to the local address bus LASA.

A display controller 518 controls an image that is to be displayed on the CRT 6. An IC card controller 519 performs the control procedure for the electrical connection of an IC card that is loaded into an IC card socket 520. An SMI controller 521 performs the control procedure for an SMI (System Management Interrupt) operation. That is, even when the CPU 501 is executing a program in the main memory 511, the SMI controller 521 generates an SMI, which is a higher order interrupt, in order to change of the setup of the computer and to shift the mode to a suspend mode.

There are a plurality of SMI types, and the SMI controller 521 exclusively generates these SMIs. More specifically, so long as one SMI has occurred and the processing for the SMI is being performed, the SMI controller 521 does not generate another SMI, even though the condition for generating that SMI is satisfied. After the processing for the current SMI has been completed, the SMI controller 521 issues a succeeding SMI. In the computer in this embodiment, an SMI occurs upon the operation of the suspend mode switch 3 and the setup switch 4. A suspend SMI occurs when the suspend mode switch 3 is operated, and the operational mode is shifted to the suspend mode. A setup SMI occurs when the setup switch 4 is operated, and the setup screen shown in FIG. 2 is displayed. An SMI (battery-low SMI) also occurs when the amount of power supplied by the batteries 18 is reduced while operating on the battery power.

A screen setup setting memory 522 is used to store the contents of the setup screen shown in FIG. 2. Data such as a date and time that are counted by a clock circuit 523 are read by the CPU 501 when the computer system is activated. A battery (not shown) that differs from the batteries 18 in FIG. 4B is employed to supply power to the screen setup setting memory 522 and the clock circuit 523. Although this battery is not rechargeable, it can continue to supply of power to the screen setup setting memory 522 and the clock circuit 523 for approximately five years.

The suspend mode will now be explained in detail. The suspend mode is provided in order to considerably reduce power consumption. The condition for shifting to the suspend mode is either when the suspend mode switch 3 is depressed or when the amount of power remaining in the battery 18 is low. Especially in the latter case, the operational mode is shifted to the suspend mode. When the computer in this embodiment has entered the suspend mode, the supply of power is halted to all units other than a section that is required for the detection of the state of the suspend mode switch 3. The suspend mode that is adopted for the computer in this embodiment is called 0 V suspend. At this time, power is also not supplied to the main memory 511. However, since when the supply of power to the main memory 511 is halted the results of a process that is being executed will be lost, before the computer is shifted to the suspend mode, all of the data, such as the contents of the main memory 511 and of the registers in the CPU 501, are written to the hard disk drive 503.

When the computer system is to be returned from the suspend mode, the contents of the main memory 511 and of the registers in the CPU 501, which are written to the hard disk drive 503 immediately before the system is shifted to the suspend mode, are retrieved and relocated to restore the main memory 511 and the registers in the CPU 501 to their previous condition. In this manner, the computer system can completely recover to the state that existed before it was shifted to the suspend mode. Since, when the system recovers from the suspend mode it can return to the state that existed before it entered the suspend mode (0 V suspend), the recovery from the suspend mode (0 V suspend) is called "resume". A program that is required to perform the above described process is stored in the BIOS memory 510. An SMM (System Management Memory) area in the main memory 511 is used as the storage area that is required for the execution of this program.

When the contents of the main memory 511 and of the registers in the CPU 501 are to be recorded on the hard disk drive 503, the address data for an area used for recording is written into the setup screen setting memory 522. When the computer system is set for recovery from the suspend mode, the hard disk drive 503 is accessed by using the address data that are stored in the screen setup setting memory 522, and the states of the main memory 511 and of the registers in the CPU 501 are returned to those that existed before the system was shifted to the suspend mode.

Figure 6A:
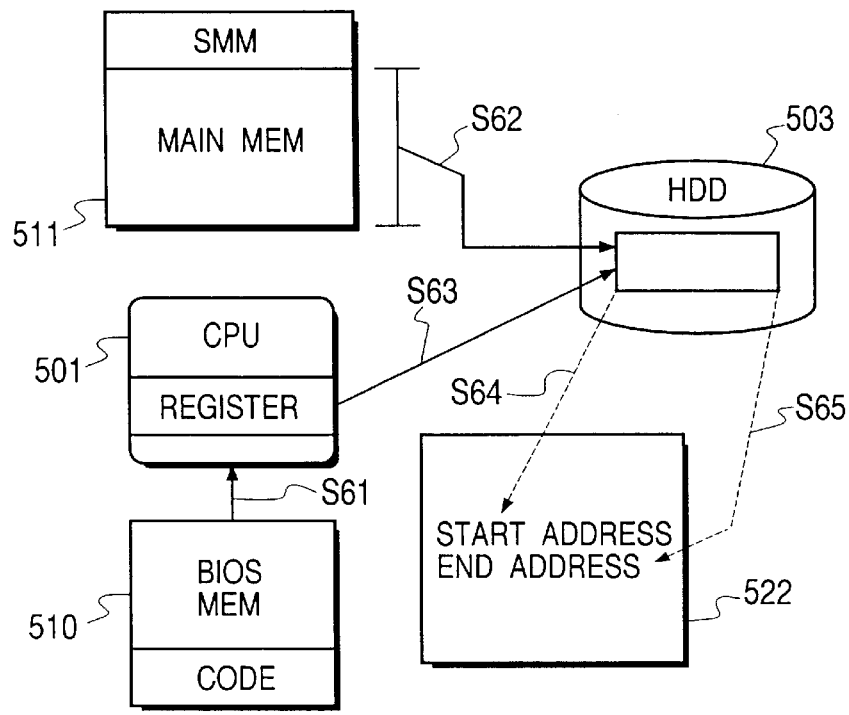
FIGS. 6A and 6B are diagrams for explaining a process for shifting to a suspend mode and a process for recovering from the suspend mode.
Figure 6B:
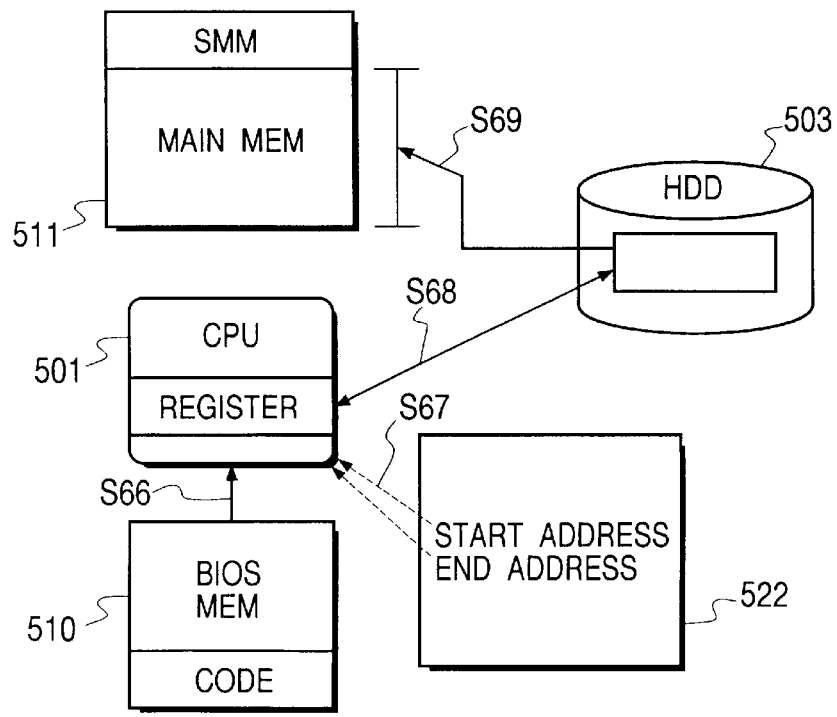

The process for shifting to the suspend mode and the process for recovering from the suspend mode will now be described in detail while referring to FIGS. 6A and 6B. The process for shifting to the suspend mode is performed as follows. When the suspend mode switch 3 is depressed in the normal operating condition, an SMI occurs and code that differs from the code that is currently being executed, i.e., a specified code in the BIOS memory 510 shown in FIG. 6A, is selected and executed. The CPU 501 services the SMI by executing the code in the BIOS memory 510 and shifts the mode to the suspend mode (S61 in FIG. 6A).

More specifically, first, the data in areas in the main memory 511, other than the SMM (System Management Memory) area, are written to the hard disk drive 503 (S62), and sequentially, the contents of the registers in the CPU 501 are also written to the hard disk drive 503 (S63). When the writing to the hard disk drive 503 is completed, a start address and an end address for the data that was written to the hard disk drive 503 are written in the screen setup setting memory 522 (S64 and S65). The start address and the end address are used when recovering from the suspend mode.

The process for recovering from the suspend mode is performed as follows. When the suspend mode switch 3 is depressed in the suspend mode, an SMI occurs and code that differs from the code that is currently being executed, i.e., a specified code in the BIOS memory 510 shown in FIG. 6B, is selected and executed. The CPU 501 services the SMI by executing the code in the BIOS memory 510 and shifts the mode to the suspend mode (S66 in FIG. 6B).

More specifically, the start address and the end address on the hard disk drive 503 are read from the setup screen setting memory 522 (S67). The data on the hard disk drive 503 extending from the start address to the end address, i.e., the data from the areas in the main memory 511, other than the SMM area, and the data from the registers in the CPU 501, which were stored immediately before the system was shifted to the suspend mode, are read out (S68). The data that are read are then stored in their original locations (S69).

As the result of performing the above processing, the system can be returned to the state that existed before the system was shifted to the suspend mode. As is apparent from the above explanation, since the contents of the main memory 511 and of the register are stored on the hard disk drive 503 in the suspend mode, data will not be lost even though the supply of power is halted.

Figure 7A:
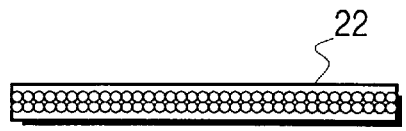
FIGS. 7A through 7D are diagrams illustrating the outline of an IC card that is used for the battery powered computer shown in FIG. 1.
Figure 7B:
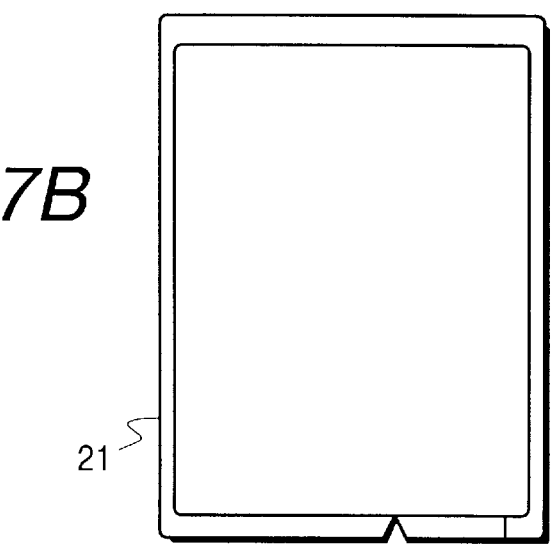
Figure 7C:
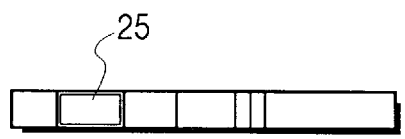
Figure 7D:
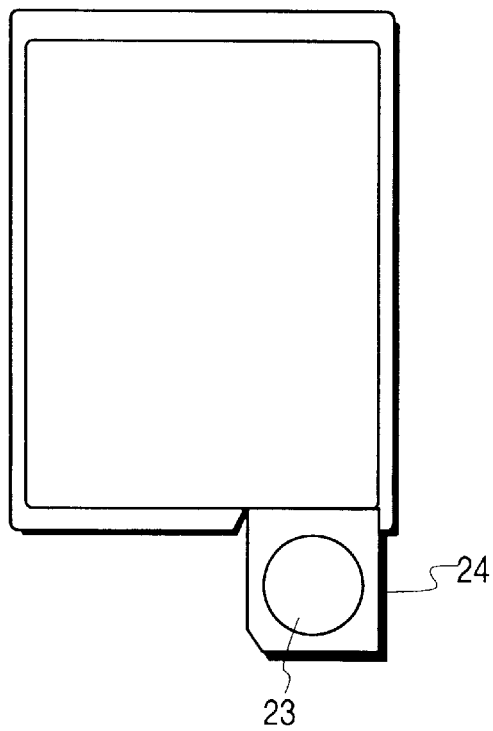
Figure 8:
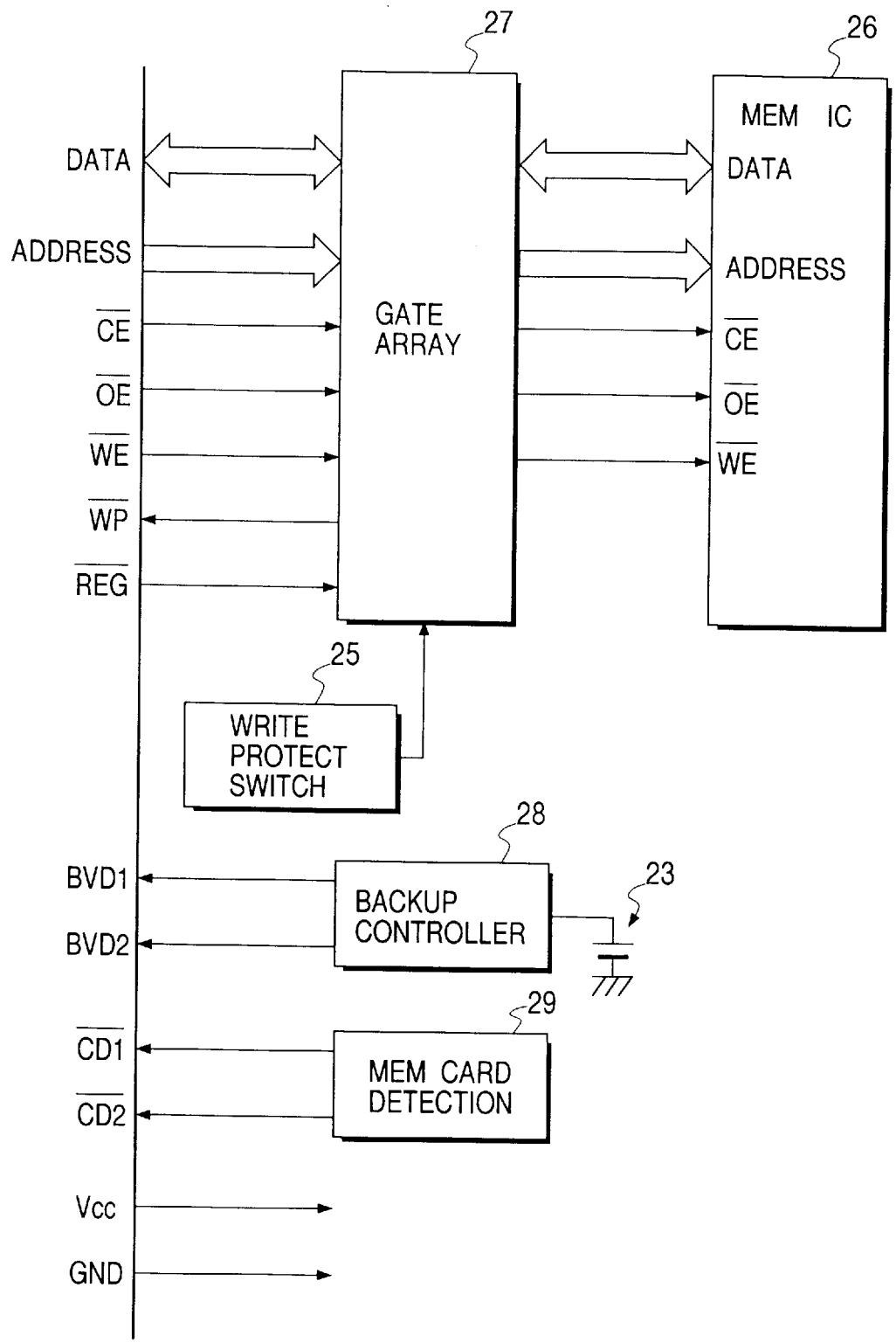
FIG. 8 is a schematic block diagram illustrating the electrical arrangement of the IC card.

An IC card that can be connected to the computer in this embodiment will now be described in detail. FIGS. 7A through 7D are diagrams showing the outline of an IC card, and FIG. 8 is a block diagram of the IC card. The IC card is a thin, flat memory card that consists primarily of an SRAM, which is a memory device. FIG. 7B is a front view of an IC card 21. A 68-pin female connector 22 is provided on the upper face of the IC card 21, as is shown in FIG. 7A, and on the bottom face of the IC card 21 are provided a battery loading drawer 24, by which a button shaped battery 23 is loaded into the IC card 21 (see FIG. 7D) and a write protect switch 25.

The button shaped battery 23 is employed to supply the power that is required to hold the memory data in the SRAM in the IC card 21. The battery loading drawer 24 is pulled out when the button shaped battery 23 is to be replaced. The write protect switch 25 is a slide switch that, as is the case with a floppy disk, protects data from being erased by an erase command that is issued by mistake. As is shown in FIG. 7C, when the write protect switch 25 is moved to the left, it is in the OFF state, and data writing/erasing can be performed as desired. When the write protect switch is moved to the right, it is in the ON state and data writing/erasing is inhibited.

The electrical arrangement of the IC card 21 is shown in FIG. 8. An SRAM, which is a memory device that is the primary component of the IC card 21, is formed in a memory IC 26. Data that are written in the SRAM are saved by the power that is supplied by the button shaped battery 23. On the IC card side, a gate array 27 controls the exchange of data with the IC card controller 519 via the IC card socket 520.

A backup controller 28 transmits to BVD1 and BVD2 a digital signal that indicates the amount of power that is supplied by the incorporated button shaped battery 23. When the IC card 21 is inserted into the IC card insertion port 7 of the computer and is connected to the IC card socket 520, a memory card detection device 29 notifies the computer that the IC card 21 is a memory card that has memory function.

DATA is a data bus that serves as a transfer path for data that are read from, and written to, the IC card 21. ADDRESS is an address bus that serves as a transfer path for address data. CE (negative logic) is a chip enable signal indicating that the memory IC 26 is selected via the gate array 27. OE (negative logic) is an output enable signal indicating that the IC card 21 is outputting data. WE (negative logic) is a write enable signal indicating that data is being written to the IC card 21. REG (negative logic) is a control line that is employed for reading, from the IC card 21, control data, such as procedures for writing to the card. When the control line is rendered active, the IC card 21 allocates the data bus and the address bus to an area in which the control data are recorded. The computer can therefore reference the control data, not the contents of the memory IC 26.

BVD1 and BVD2 output as a digital signal the amount of power that is supplied by the backup power source (button shaped battery 23). CD1 (negative logic) and CD2 (negative logic) are card detection signals. Vcc is power that is supplied from the main body, and GND is a ground terminal.

When the IC card 21 is inserted into the card insertion port 7 of the computer system that is being operated, or when the power switch 2 of the computer is turned on while the IC card 21 is inserted through the insertion port 7 and the supply of power is initiated, the control data must be read first. The initialization is performed in consonance with the control data that is read in order to prepare the IC card 21 for use.

The IC card 21 shown in FIGS. 7A to 7D and FIG. 8 is a card in which the SRAM is incorporated in order to provide a new memory area in addition to the main memory 511. Besides such a card that incorporates the SRAM, the IC card 21 can be configured as a modem card that functions as a modem and uses a telephone line for data exchange, or as a serial I/O card that provides not only the serial transfer port 513 but also a second serial transfer port.

When the computer is continuously operated by using only the power that is supplied by the batteries 18, and is not connected to a commercially available power outlet, most of the power charge in the batteries 18 will be exhausted when several hours have passed. If such a situation occurs, and no commercially available power outlet is available, an operator will select a suspend mode in order to extend for as long as possible the operation time of the computer.

Figure 9:
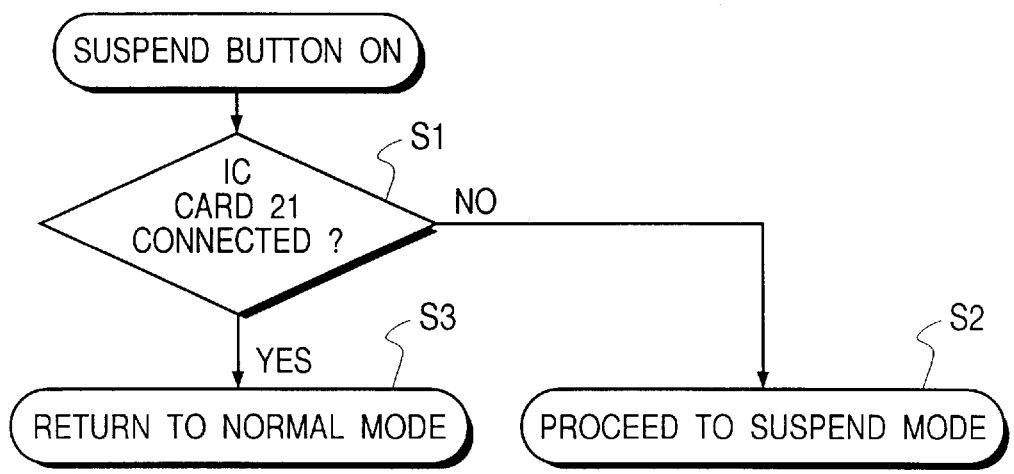
FIG. 9 is a flowchart showing a process for shifting to a suspend mode according to a first embodiment.

The process for shifting to the suspend mode while the IC card 21 is in the card insertion port 7 will now be explained while referring to the flowchart in FIG. 9. The shift to the suspend mode is instructed by depressing the suspend/resume button 3.

More specifically, when the suspend/resume button 3 is depressed in the normal operational state, the SMI controller 521 generates an SMI that requests the CPU 501 to shift to the suspend mode. The CPU 501 then begins the processing for shifting to the suspend mode. During this processing, the CPU 501 determines whether or not an IC card 21 of the above described type is connected to the IC card socket 520 (step S1).

Specifically, the determination of the connection of the IC card 21 is performed as follows. When the IC card 21 is inserted into the insertion port 7, the IC card controller 519 outputs a signal to that effect to the CPU 501. Upon receipt of the signal, the CPU 501 records the status data for the IC card 21 that has been inserted in an arbitrary location in the main memory 511, which is the primary memory of the computer. When the IC card 21 is removed, the IC card controller 519 outputs a signal to that effect to the CPU 501, and the CPU 501, upon receipt of the signal, understands that the IC card 21 has been removed, and clears the status data that are recorded in the above location. Therefore, the CPU 501 determines the connection state of the IC card 21 by examining the status data that are recorded in the main memory 511.

If, at step S1, it is ascertained that the IC card 21 is not connected, the CPU 501 holds the contents of the main memory 511 and of the registers in the CPU 501, and shifts to the suspend mode (step S2). When it is ascertained that the IC card 21 is connected, the operational mode is not shifted to the suspend mode and is returned to the normal mode (step S3). As is described above, since, when the IC card 21 is connected, the operational mode is not shifted to the suspend mode and is returned to the normal mode, the logical connection data for the IC card 21 will not be lost even when a user depresses the suspend/resume button 3. Further, it is possible to prevent, in advance, an abnormal connection with the IC card 21, which is due to the shifting to the suspend mode, and the erasing of data that are exchanged with the IC card 21.

[Second Embodiment]

Figure 10:
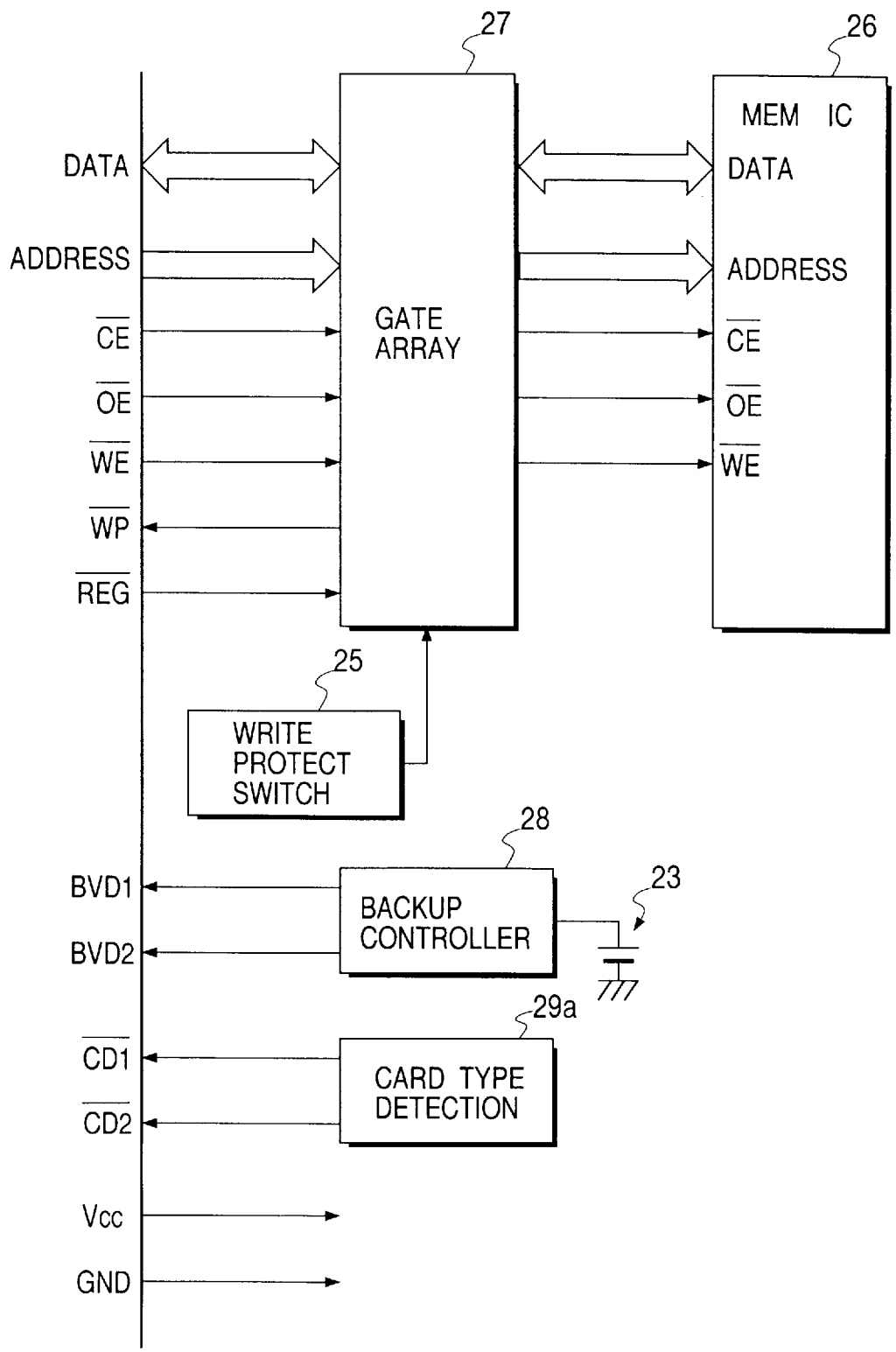
FIG. 10 is a schematic block diagram illustrating the electrical arrangement of an IC card according to a second embodiment.

In the first embodiment, the operation mode is not shifted to the suspend mode when the connection of the IC card 21 is detected, regardless of the type of IC card 21 that is involved. When the connection of the IC card 21 is not detected, the mode is shifted to the suspend mode. In the second embodiment, however, an operator can determine whether or not the mode should be shifted to the suspend mode, depending on the type of IC card 21 that is involved. In this embodiment, as is shown in FIG. 10, a card type detection device 29a is provided on the IC card 21, instead of the memory card detection device 29 (see FIG. 8) in the first embodiment.

Figure 11:
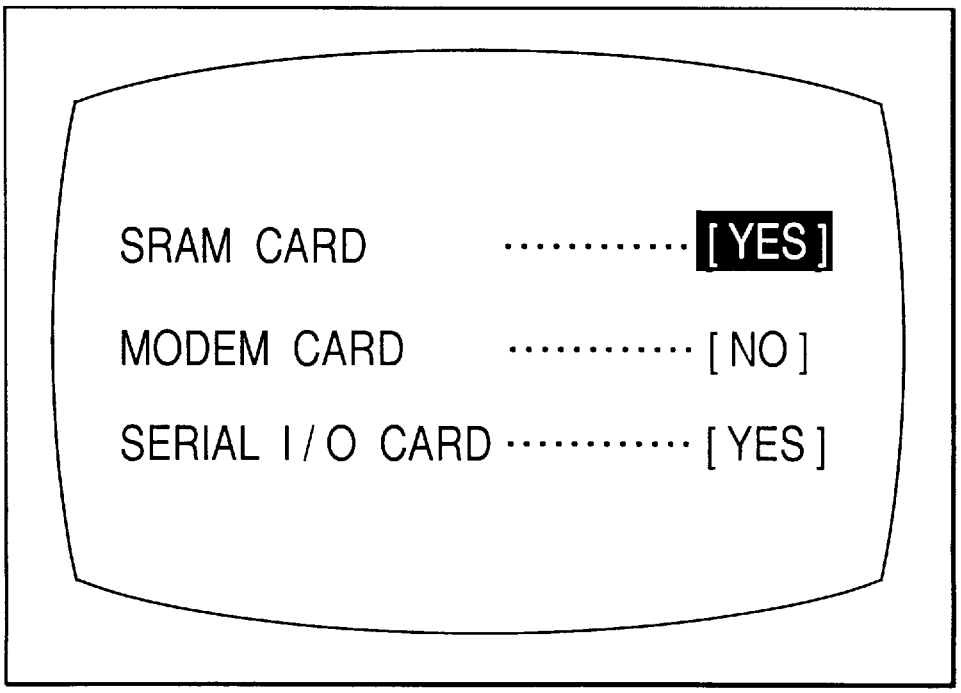
FIG. 11 is a diagram showing an example setup screen for setting individual IC cards, whether or not they are shifted to the suspend mode according to the second embodiment.

When a setup button 4 is depressed, a setup screen on which messages are displayed as is shown in FIG. 11 appears on a CRT 6. This condition is called a setup mode, and messages "SRAM CARD," "MODEM CARD," and "SERIAL I/O CARD" are displayed. Then highlighted "YES" indicates the setup relative to the "SRAM CARD" that is currently selected.

A down arrow key 14 is used to select the setup for "MODEM CARD" or for "SERIAL I/O CARD". When one of these setups is selected, a corresponding "YES" or "NO" is highlighted. A "YES" indicates that the operational mode is shifted to the suspend mode when the IC card 21 that is represented by a corresponding message is connected. A "NO" indicates that the operational mode is not shifted to the suspend mode when the IC card 21 is connected that is represented by a corresponding message. That is, the state in FIG. 11 means that the operational mode is not shifted to the suspend mode when the "MODEM CARD" is connected, and that the mode is not shifted to the suspend mode when another card type is connected.

The switching between "YES" and "NO" is performed by a left arrow key 13 and a right arrow key 16, i.e., by a right or a left arrow key. For example, when either the right or the left arrow key is depressed once when the "NO" is selected, the setup is changed to "YES". When either the right or the left arrow key is depressed once more, the setup is returned to "NO." When the setup is completed, an ESC key 8 is depressed to return to the normal mode.

The setup contents are recorded in a setup screen setting memory 522. The determination of the IC card 21 type is performed by the card type detection device 29a in FIG. 10. More specifically, when an IC card 21 is connected to an IC card socket 520, the card type detection device 29a notifies the CPU 501 what type of IC card 21, either an SRAM card, a modem card, or a serial I/O card, is connected.

Figure 12:
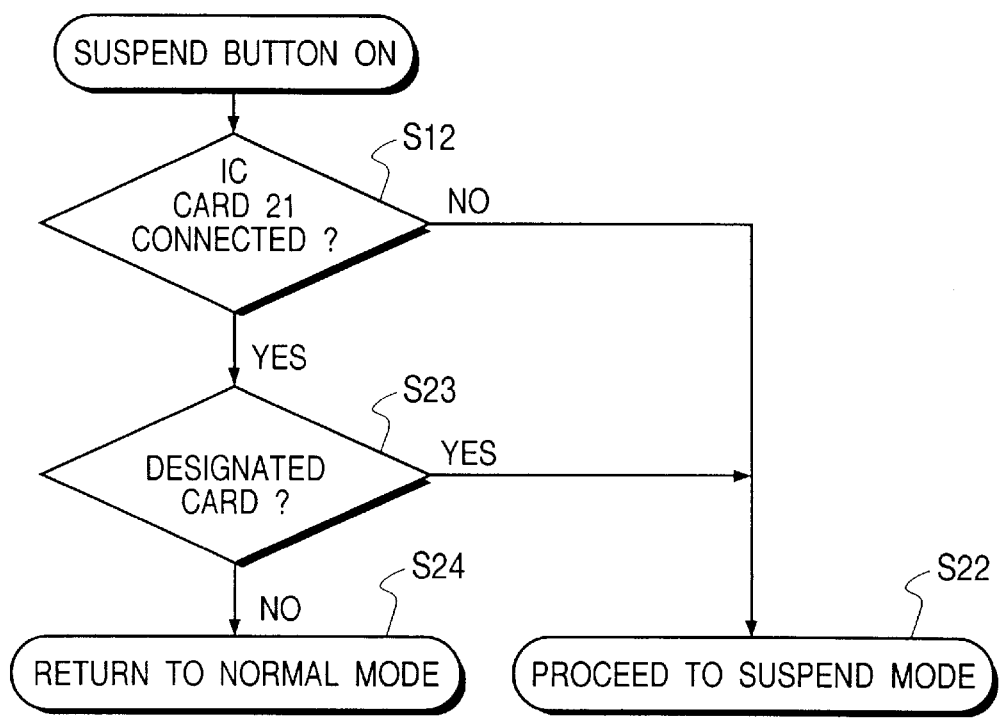
FIG. 12 is a flowchart showing a process for shifting to the suspend mode according to the second embodiment.

The above described operation will now be explained while referring to the flowchart in FIG. 12. When the suspend/resume button 3 is depressed for switching to the suspend mode, the CPU 501 determines whether or not an IC card 21 is connected (step S21). When an IC card 21 is not connected, the operational mode is switched to the suspend mode (step S22).

When an IC card 21 is connected, a check is performed to determine whether or not the IC card 21 is so designated (set) that the switch to the suspend mode (step S23) can be performed. This determination is performed by comparing a value that an operator has designated using the setup screen in FIG. 11 (which is stored in the setup screen setting memory 522) with the card type that is detected by the card type detection device 29a.

If, at step S23, it is ascertained that the IC card 21 is so designated (set) that the switch to the suspend mode can be performed (for example, when the IC cards 21 are an SRAM card and a serial card in the setup example in FIG. 11), the operational mode is shifted to the suspend mode (step S22). If it is ascertained that the IC card 21 is not so designated (set) that the switch to the suspend mode can be performed (for example, when the IC card 21 is a modem card in the setup example in FIG. 11), the mode is returned to the normal mode (step S24).

In other words, when an IC card is employed, such as a modem card, that sequentially receives data externally and transfers the data to the computer system, the system is so set in advance that the shift to the suspend mode can not be performed. Then, even when a shift to the suspend mode is instructed, such a change is inhibited and the loss of data that are received is prevented.

[Third Embodiment]

In the first embodiment, the shift to the suspend mode is determined by whether or not the connection of an IC card 21 is detected. In the third embodiment, a warning is given to notify an operator that the connection of an IC card 21 has been detected.

Figure 13:
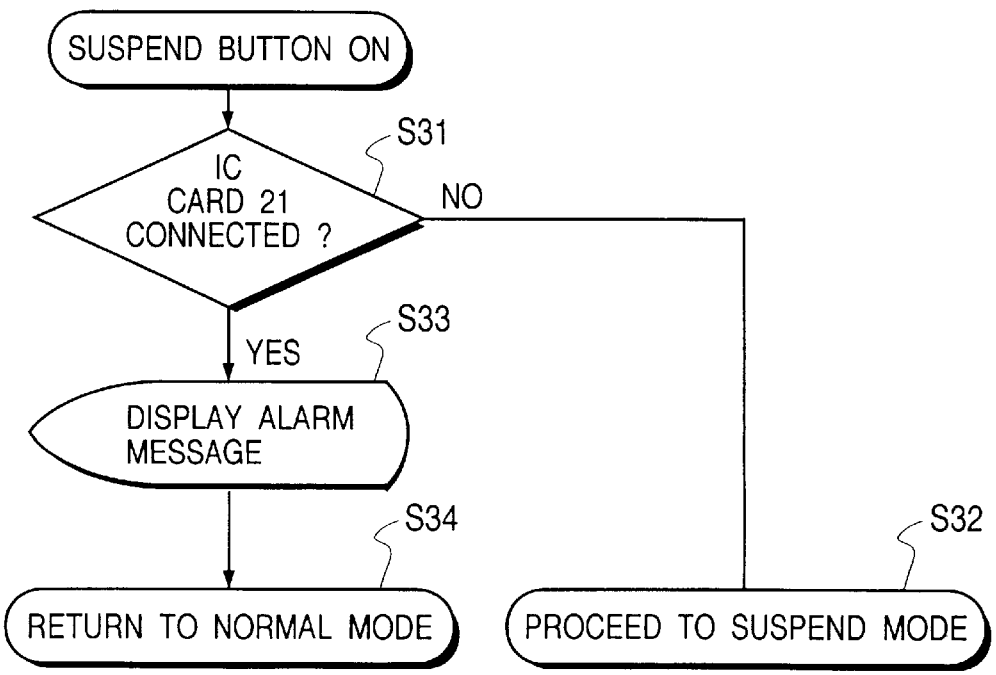
FIG. 13 is a flowchart showing a process for shifting to a suspend mode according to a third embodiment.

The processing in the third embodiment will now be explained while referring to the flowchart in FIG. 13. When the shift to the suspend mode is instructed by depressing the suspend/resume button 3, the CPU 501 determines whether or not an IC card 21 is connected (step S31). When the CPU 501 ascertains that an IC card 21 is not connected, the operational mode is shifted to the suspend mode (step S32).

Figure 14:
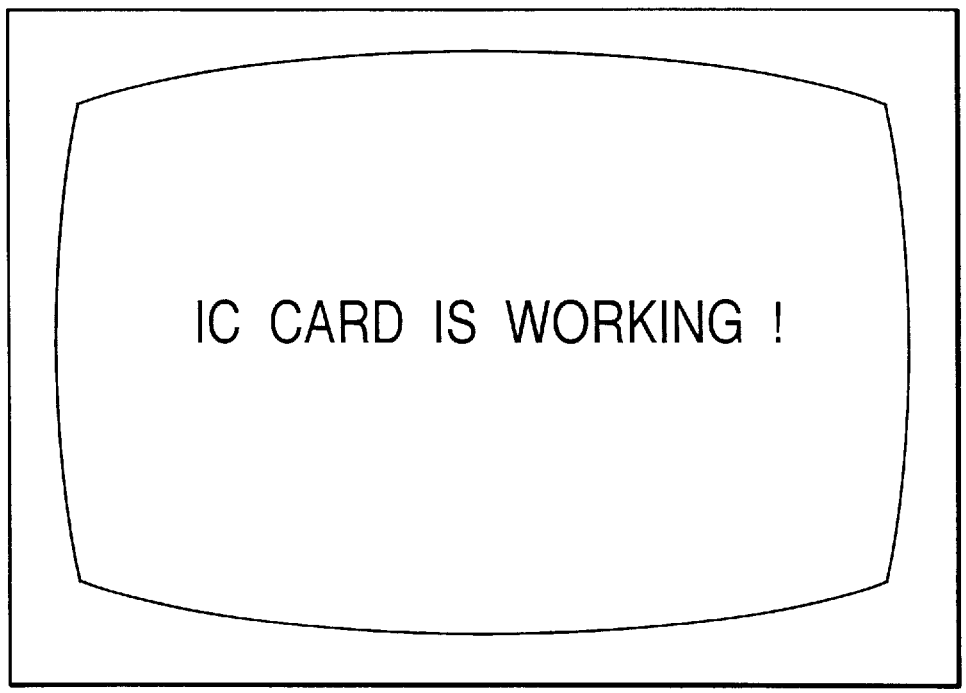
FIG. 14 is a diagram showing an example warning message according to the third embodiment.

When an IC card 21 is connected, a warning message, such as "IC CARD IS WORKING!", which is shown in FIG. 14, is displayed on the CRT 6 (step S33). The time period for the display of the warning message should be long enough for an operator to read and understand the message contents, and is preferably 0.5 to 2 seconds. After the warning message has been displayed, the operational mode is returned to the normal mode (step S34).

As is described above, before the shift to the suspend mode, an operator is warned that the operation of a connected device is not ensured. Therefore, it is possible to prevent the transfer of data to the connected device from being mistakenly halted by carelessly shifting to the suspend mode.

[Modification of the Third Embodiment]

In the third embodiment, the operational mode is returned to the normal mode after the warning message is displayed at step S33. However, the mode can be shifted to the suspend mode after the warning message is displayed. In this case, a warning message is displayed to notify an operator that the IC card 21 is no longer connected.

Figure 15:
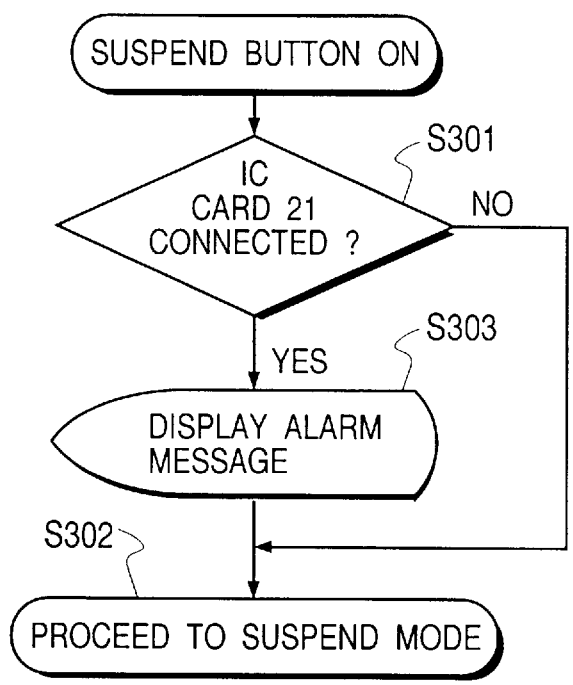
FIG. 15 is a flowchart showing a process for shifting to the suspend mode according to a modification of the third embodiment.

A process such as is shown in the flowchart in FIG. 15 is performed when the shift to the suspend mode is instructed by the depression of the suspend/resume button 3. The CPU 501 determines whether or not the IC card 21 is connected (step S301). When the CPU 501 ascertains that the IC card 21 is not connected, the mode is shifted to the suspend mode (step S302).

Figure 16:
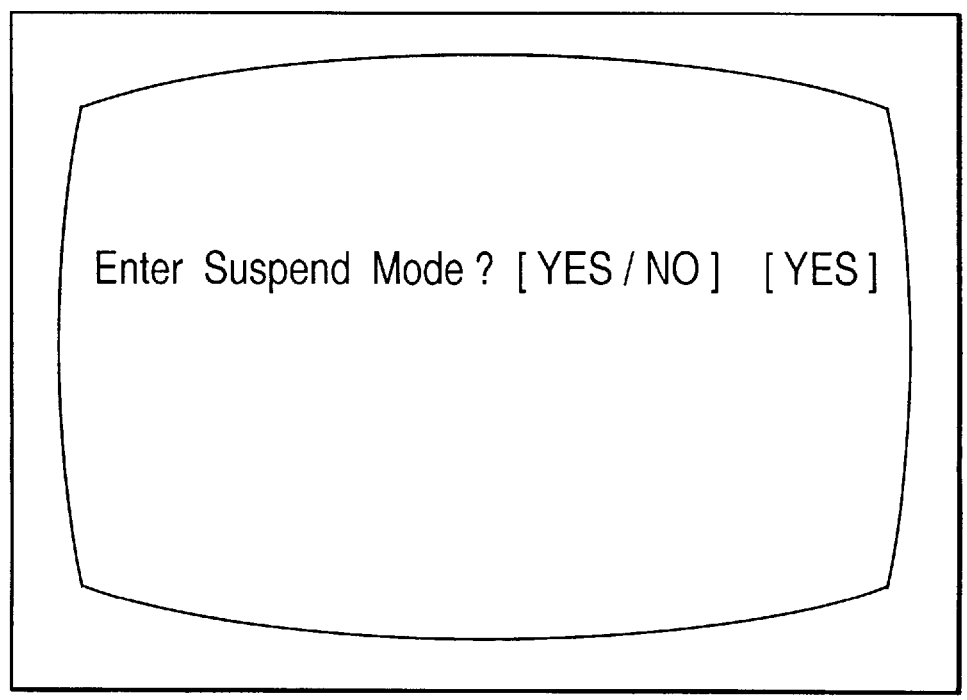
FIG. 16 is a diagram showing an example message for receiving an instruction from an operator according to a further modification of the previously modified third embodiment.

When the IC card 21 is connected, a warning message, such as "IC CARD IS WORKING!", which is shown in FIG. 14, is displayed on the CRT 6 (step S303). Program control advances to step S302 whereat the operational mode is shifted to the suspend mode. After the warning message shown in FIG. 14 has been displayed, instead of unconditionally shifting to the suspend mode, the following process may be performed. A question such as is shown in FIG. 16, for example, is displayed asking whether or not the mode should be shifted to the suspend mode. When the response "YES" is selected, the mode is shifted to the suspend mode, and when the "NO" is selected, the mode is returned to the normal mode.

[Fourth Embodiment]

In the third embodiment and its modification, when an operator instructs the shifting of the mode to the suspend mode and an IC card 21 is connected, a warning message is displayed. Thereafter, the operational mode is returned to the normal mode or is shifted to the suspend mode, either unconditionally or in consonance with an instruction given by an operator. In the fourth embodiment, when the IC card 21 is connected, a warning message is displayed, and whether the operational mode should be returned to the normal mode or should be shifted to the suspend mode is determined in consonance with the amount of power that is being supplied by the batteries 18.

Figure 17:
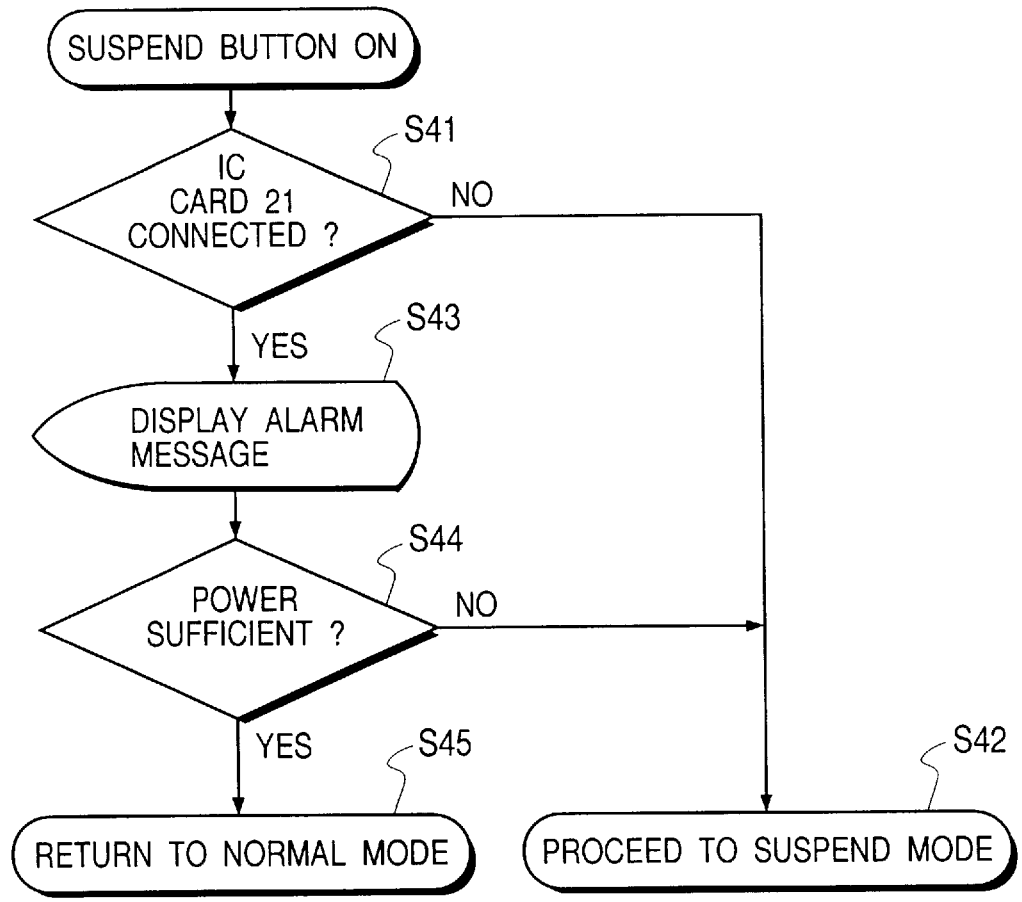
FIG. 17 is a flowchart showing a process for shifting to a suspend mode according to a fourth embodiment.

More specifically, as is shown in the flowchart in FIG. 17, when the shifting to the suspend mode is instructed by the depression of the suspend/resume button 3, the CPU 501 determines whether or not the IC card 21 is connected (step S41). When the IC card 21 is not connected, the operational mode is shifted to the suspend mode (step S42).

When the IC card 21 is connected, the warning message for the third embodiment that is shown in FIG. 14, for example, is displayed on the CRT 6 (step S43). A check is then performed to determine whether or not the remaining capacity of the batteries 18 that is detected by the power manager 510 is sufficient to drive the computer system for at least five minutes (step S44). If it is ascertained that the remaining capacity of the batteries 18 is sufficient, the operational mode is returned to the normal mode (step S45). If the remaining capacity is insufficient, the operational mode is shifted to the suspend mode (step S42).

[Fifth Embodiment]

In the fourth embodiment, the computer system examines the power available from the batteries 18 and depending on the available power the mode is automatically shifted to the suspend mode in consonance with an operator's selection. In the fifth embodiment, the mode is shifted to the suspend mode in accordance with an instruction that is issued by an operator.

Figure 18:
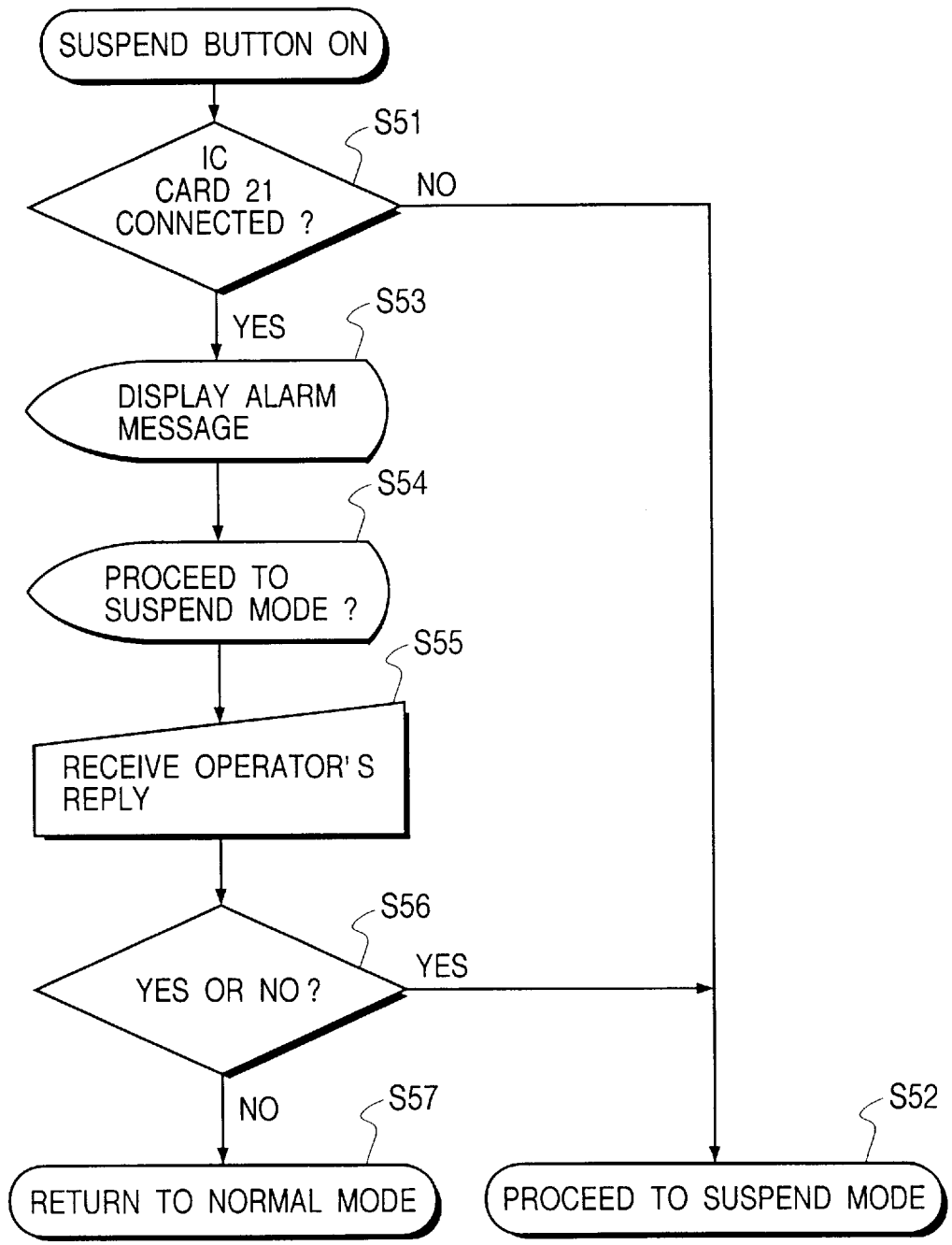
FIG. 18 is a flowchart showing a process for shifting to a suspend mode according to a fifth embodiment.
Figure 19:
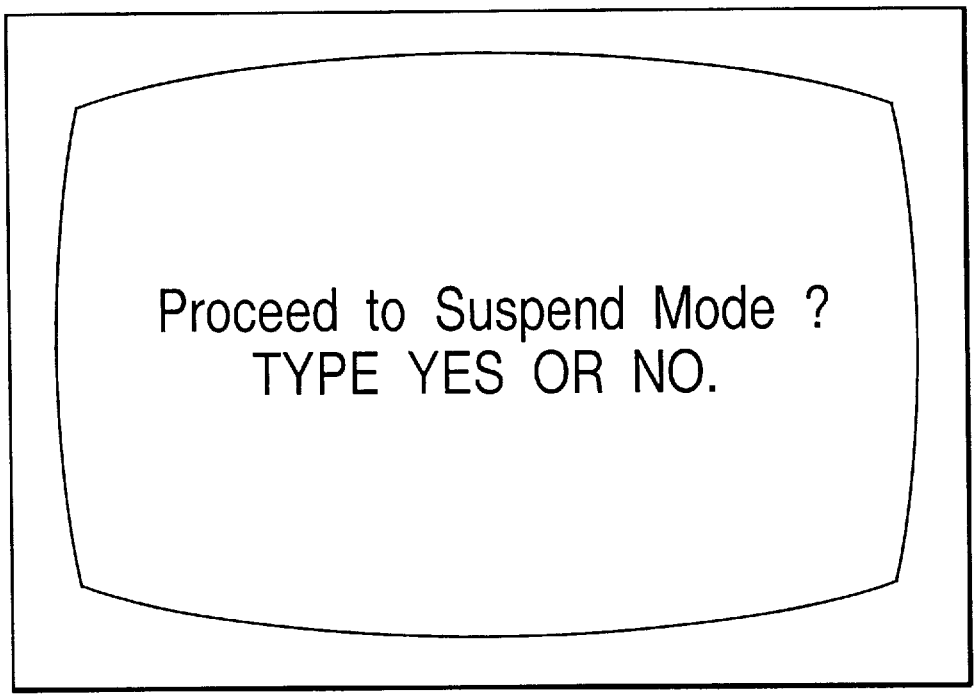
FIG. 19 is a diagram showing an example message for requesting an instruction from an operator according to the fifth embodiment.

More specifically, as is shown in the flowchart in FIG. 18, when the shift to the suspend mode is instructed by the depression of the suspend/resume button 3, the CPU 501 determines whether or not the IC card 21 is connected (step S51). If the CPU 501 ascertains that the IC card 21 is not connected, the operational mode is shifted to the suspend mode (step S52).

If the IC card 21 is connected, the warning message shown in FIG. 14 for the third embodiment is displayed on the CRT 6 for one second (step S53). Sequentially, a question, such as "Proceed to Suspend Mode? TYPE YES OR NO.", is displayed to ask an operator whether or not to shift the operational mode to the suspend mode (step S54). When the operator desires to shift to the suspend mode, he or she enters "YES" at the keyboard 5. When the operator does not desire to shift to the suspend mode, he or she enters "NO". The CPU 501 receives the operator's response (step S55), and determines whether "YES" or "NO" has been entered (step S56). If "YES" has been entered, the operational mode is shifted to the suspend mode (step S52). If "NO" has been entered, the operational mode is returned to the normal mode (step S57).

[Sixth Embodiment]

In the second through the fifth embodiments, a warning is given to an operator before the operational mode is shifted to the suspend mode. In the sixth embodiment, however, a warning is given when the system is to be recovered from the suspend mode.

Figure 20A:
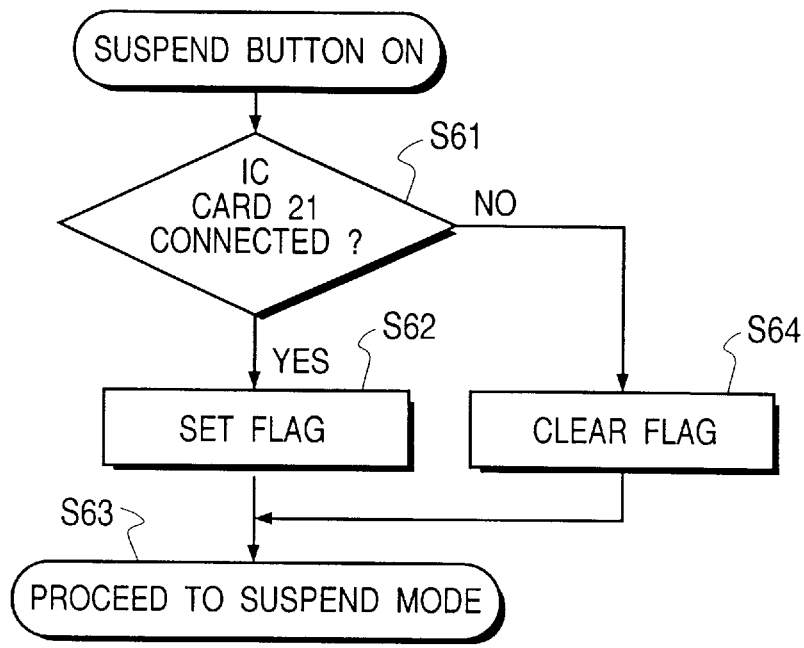
FIGS. 20A and 20B are flowcharts showing a process for shifting to a suspend mode according to a sixth embodiment.
Figure 20B:
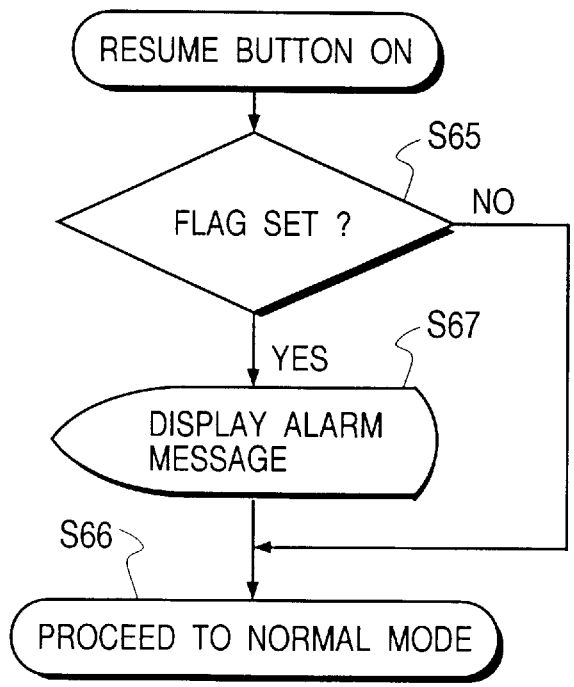

The process in the sixth embodiment will now be described while referring to the flowcharts in FIGS. 20A and 20B. When the shift to the suspend mode is instructed by the depression of the suspend/resume button 3, the CPU 501 determines whether or not an IC card 21 is connected (step S61). If the CPU 501 ascertains that an IC card 21 is connected, a connection flag is set (step S62) and the operational mode is shifted to the suspend mode (step S63). If the CPU 501 ascertains that an IC card 21 is not connected, the connection flag is cleared (step S64) and the operational mode is shifted to the suspend mode (step S63). The setup for the connection flag is stored in one part of the screen setup setting memory 522, for which the power supply is backed up by the batteries 18. Thus, even when the mode is shifted to the suspend mode, the data indicated by the connection flag will not be lost.

Figure 21:
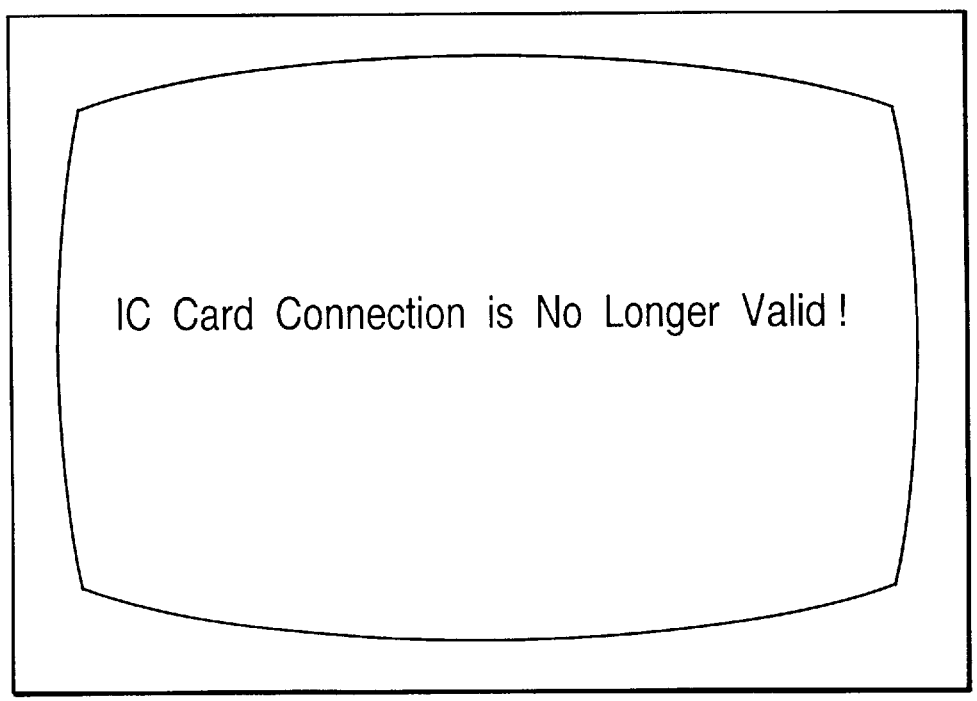
FIG. 21 is a diagram showing an example warning message according to the sixth embodiment.

When the recovery from the suspend mode is instructed by the depression of the suspend/resume button 3, the CPU 501 determines whether or not the connection flag is set (step S65). If the CPU 501 ascertains that the connection flag is not set, the operational mode is recovered to the normal mode (step S66). If the connection flag is set, a warning message, such as "IC Card connection is No Longer Valid!", as is shown in FIG. 21, is displayed on the CRT 6 to notify an operator that the logical connection of the currently connected IC card with the computer is already lost (step S67). Then, the operational mode is recovered to the normal mode (step S66).

As is described above, a warning is given before the system is recovered from the suspend mode. Therefore, while the condition of the computer after it recovers from the suspend mode is the same as that before it entered the suspend mode, an operator can be notified that the connected device can no longer be accessed, and an unnecessary access of such a device can be avoided.

The present invention is not limited to the above described embodiments. For example, the process for shifting to the suspend mode does not necessarily have to begin upon the depression of the suspend/resume button, and can be automatically begun when the amount of power from the battery is very low and a battery-low SMI occurs. A warning need not be given only by a display on the CRT but may also be an audible warning that is emitted through the loudspeaker. Further, the externally connected device is not limited to an IC card and may be a printer, for example.

As is described above, according to the present invention, a battery powered computer, for which operating power is provided by a battery, comprises: detection means for detecting a connection state for the battery powered computer and an external device; and determination means for, when a request is made to shift to a suspend mode in which consumption of power supplied by the battery is lower than in a normal state, at least determining, in consonance with the connection state detected by the detection means, whether or not an operation mode is to be shifted to a suspend mode. Therefore, an abnormal state of the connection with an external device, which is due to the shift to the suspend mode, and the erasing of data that are exchanged with the external device can be prevented in advance, and a process for shifting to the suspend mode can be adequately performed in consonance with the state of connection with an external device.

In addition, according to the present invention, a battery powered computer, for which operating power is supplied a battery, comprises: detection means for detecting a state in which the battery powered computer is connected to an external device; and control means that, when a request is made to recover from a suspend mode, wherein consumption of power supplied by the battery is lower than for a normal state in a normal operational mode, and the detection means detects that the battery powered computer is connected to an external device, gives a warning indicating the external device is connected and is recovering from the suspend mode to the normal operational mode, or that, when the detection means does not detect that the battery powered computer is connected to an external device, recovers immediately from the suspend mode to the normal operational mode. Thus, when the computer is recovered to the normal mode, an operator can avoid an unnecessary access of an external device that is no longer valid, and a process for recovering from the suspend mode can be adequately performed in consonance with the state of the connection with the external device.

What is claimed is:

1. A battery powered computer, for power down which operating power is provided by a battery, comprising:

first detection means for detecting a shift instruction for shifting said computer from a normal mode to a suspend mode in which consumption of power supplied by the battery is lower than in the normal state;

second detection means for detecting whether an external device is connected to said computer;

drive means for driving said computer in the suspend mode in response to the shift instruction detected by said first detection means; and control means for controlling said drive means to drive said computer in the suspend mode if said first detection means detects the shift instruction in the event that the second detection means detects that the external device is not connected to said computer and for controlling said drive means not to drive said computer in the suspend mode even if said first detection means detects the shift instruction in the event that said second detection means detects that the external device is connected to said computer.

2. A battery powered computer according to claim 1, wherein said second detection means comprises means for identifying a type of the external device connected to said computer and wherein an operational mode shall not be shifted to said suspend mode, even upon detection of the shift instruction when the identified device type is a specific one, and the operational mode shall be shifted to said suspend mode in consonance with the detection of the shift instruction when the identified device type is not the specific one.

3. A battery powered computer according to claim 1, wherein when said second detection means detects that said battery powered computer is connected to the external device, an operational mode shall not be shifted to the suspend mode, even upon detection of the shift instruction, and said control means issues a warning that the external device is connected; and wherein when said second detection means detects that said battery powered computer is not connected to the external device, the operational mode shall be shifted to the suspend mode in consonance with the shift instruction.

4. A battery powered computer according to claim 1, wherein when said first detection means detects the shift instruction and said second detection means detects that said battery powered computer is connected to the external device, said control means issues a warning that the external device is connected, and wherein when said first detection means detects the shift instruction and said second detection means detects that said battery powered computer is not connected to the external device, said control means immediately controls the drive means to shift to the suspend mode.

5. A battery powered computer according to claim 1, wherein when said second detection means detects that said battery powered computer is connected to the external device, said control means issues a warning that the external device is connected and determines in consonance with a mode instruction whether or not an operational mode is to be shifted to the suspend mode; and wherein when said second detection means detects that said battery powered computer is not connected to the external device, said control means controls said drive means to shift to the suspend mode.

6. A battery powered computer according to claim 1, wherein said shift instruction is made by a determination that an amount of power supplied from said battery is a predetermined amount or less.

7. A battery powered computer according to claim 1, wherein said external device is an IC card.

8. A battery powered computer, for which operation power is provided by a battery, comprising:

first detection means for detecting a shift instruction for shifting said computer from a suspend mode in which consumption of power supplied from the battery is lower than in a normal mode to the normal mode;

second detection means for detecting whether an external device is connected to said computer;

drive means for driving said computer in the normal mode in response to the shift instruction detected by said first detection means; and control means for issuing a warning that the external device is connected to said computer and thereafter controlling said drive means to drive said computer in the normal mode in response to said first detection means detecting the shift instruction in the event that the second detection means detects that the external device is connected to said computer.

9. A battery powered computer according to claim 8, wherein said external device is an IC card.

10. A battery powered computer according to claim 8, wherein said warning is issued by displaying a warning message.

11. A computer according to claim 8, wherein said control means controls said drive means to drive said computer in the normal mode without issuing the warning in response to said first detection means detecting the shift instruction in the event that said second detection means detects that the external device is not connected to said computer.

12. A power management method, for a battery powered computer, for which operating power is provided by a battery, comprising:

a first detection step for detecting a shift instruction for shifting said computer from a normal mode to a suspend mode in which consumption of power supplied by the battery is lower than in the normal state;

a second detection step of detecting whether an external device is connected to said computer;

a drive step for driving said computer in the suspend mode in response to the shift instruction detected in the first detection step; and a control step of controlling said driving step to drive said computer in the suspend mode if the first detection step detects the shift instruction in the event that the second detection step detects that the external device is not connected to said computer and for controlling said driving step not to drive said computer in the suspend mode even if said first detection step detects the shift instruction in the event that the second detection step detects that the external device is connected to the computer.

13. A power management method, for a battery powered computer, for which operating power is provided by a battery, comprising:

a first detection step for detecting a shift instruction for shifting said computer from a suspend mode in which consumption of power supplied from the battery is lower than in a normal mode to the normal mode;

a second detection step for detecting whether an external device is connected to said computer;

a drive step for driving said computer in the normal mode in response to the shift instruction detected in said first detection step; and a control step for issuing a warning that the external device is connected to said computer and thereafter controlling said drive step to drive said computer in the normal mode in response to said first detection step detecting the shift instruction in the event that the second detection steps detects that the external device is connected to said computer.

14. A power management method according to claim 13, wherein said external device is an IC card.

15. A power management method according to claim 13, wherein said warning is issued by displaying a warning message.

16. A power management method according to claim 13, wherein said control step controls said drive step to drive said computer in the normal mode without issuing the warning in response to said first detection step detecting the shift instruction in the event that said second detection step detects that the external device is not connected to said computer.

* * * * *

UNITED STATES PATENT AND TRADEMARK OFFICE
CERTIFICATE OF CORRECTION

PATENT NO. : 5,832,285
DATED : November 3, 1998
INVENTOR(S) : NAOKI SHIMADA

It is certified that error appears in the above-identified patent and that said Letters Patent is hereby corrected as shown below:

COLUMN 2

Line 46, "supplied" should read --supplied by--.

COLUMN 6

Line 29, "of" should be deleted.
    Line 63, "above" should read --above---.

COLUMN 9

Line 16, "above described" should read --above-described--.

COLUMN 10

Line 28, "above described" should read --above-described--.

COLUMN 13

Line 13, "above" should read --above---.
    Line 41, "supplied" should read --supplied by--.
    Line 62, "power down" should be deleted.

Signed and Sealed this

Twentieth Day of July, 1999

Attest:

Q. TODD DICKINSON

*Attesting Officer*     *Acting Commissioner of Patents and Trademarks*